US006539174B1

(12) United States Patent
Tanii et al.

(10) Patent No.: US 6,539,174 B1
(45) Date of Patent: Mar. 25, 2003

(54) LIGHT IMAGE SHIFT CORRECTING DEVICE AND AN OPTICAL DEVICE

(75) Inventors: Junichi Tanii, Izumi (JP); Minoru Kuwana, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/716,369

(22) Filed: Nov. 21, 2000

(30) Foreign Application Priority Data

Nov. 22, 1999  (JP) .......................................... 11-331162

(51) Int. Cl.[7] .............................................. G03B 17/00
(52) U.S. Cl. ...................................................... 396/55
(58) Field of Search ............................. 396/52, 53, 54, 396/55; 359/819, 824

(56) References Cited

U.S. PATENT DOCUMENTS 5,870,634 A  *  2/1999  Sugaya et al. ................ 396/55

FOREIGN PATENT DOCUMENTS

| JP | 63-161883 | * | 7/1988 |
| JP | 3-159581 |  | 7/1991 |
| JP | 03-159581 | * | 7/1991 |
| JP | 3-159581 | * | 9/1991 |
| JP | 4-1712 |  | 1/1992 |
| JP | 8-294287 |  | 11/1996 |

* cited by examiner

Primary Examiner—Russell Adams
Assistant Examiner—Arthur A Smith
(74) Attorney, Agent, or Firm—McDermott, Will & Emery

(57) ABSTRACT

A light image shift correcting device is provided with a planar member having a reference surface perpendicular to an optical axis of a focusing optical system, a shift correcting optical member having a flange portion at its periphery, an urger for movably pressing the shift correcting optical member against the reference surface of the planar member at a plurality of parts of the flange portion, a torus type piezoelectric actuator pressed against the flange portion by a part of the urger, and a controller for controlling the torus type piezoelectric actuator. The device can highly precisely control a light image shift correcting optical member despite its simple construction and can be made smaller.

5 Claims, 12 Drawing Sheets

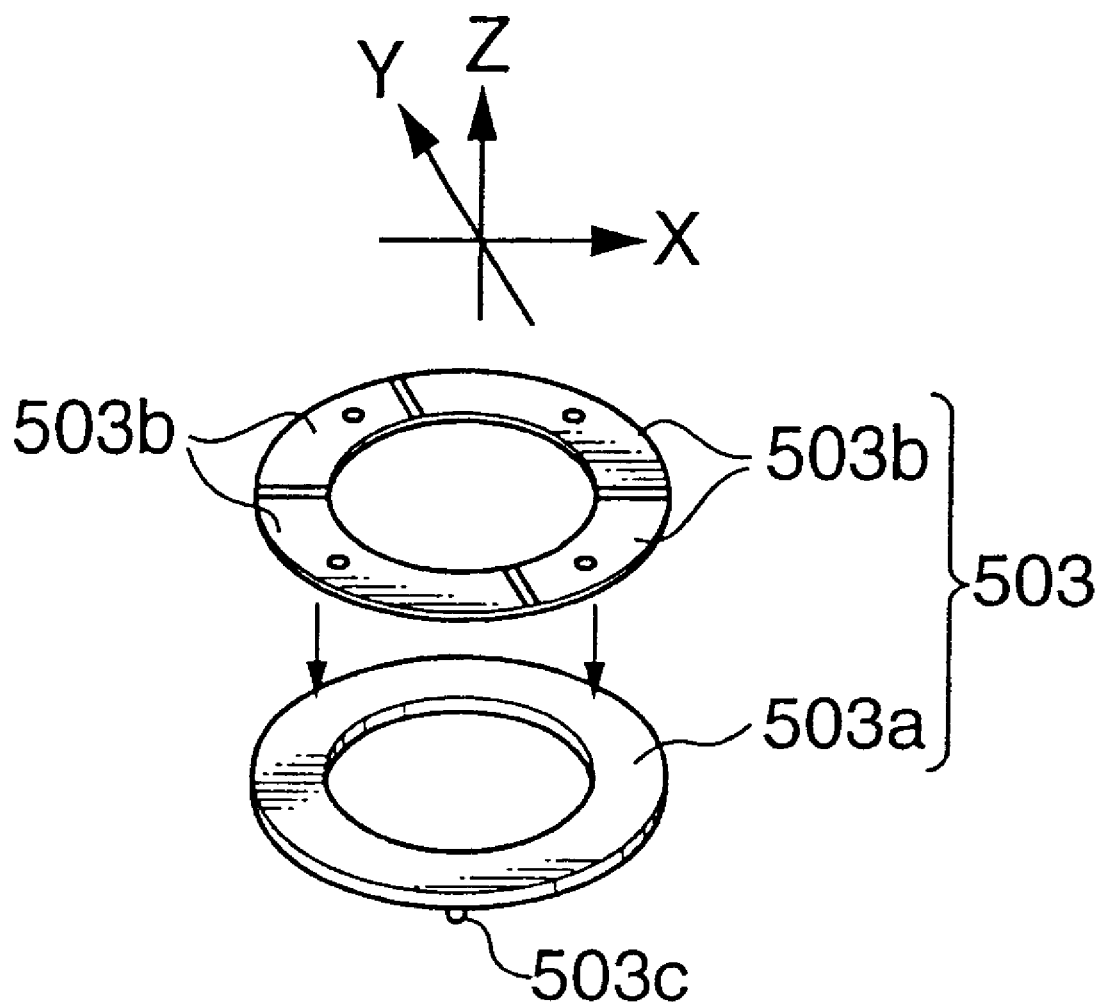

LIGHT IMAGE SHIFT CORRECTING DEVICE AND AN OPTICAL DEVICE

This application is based on patent application No. 11-331162 filed in Japan, the contents of which are hereby incorporated by references.

BACKGROUND OF THE INVENTION

This invention relates to a light image shift correcting device for optically correcting a shift of a light image on a focusing plane resulting from a shake of hands holding a camera, binocular, telescope or the like, and an optical device provided with a piezoelectric actuator.

Image shift correcting devices for optically correcting a shift of a light image in an optical apparatus have been known. For example, Japanese Unexamined Patent Publication 8-294287 discloses a light image shift correcting device shown in FIG. 24.

The light image shift correcting device is constructed as follows. A flange 502 is so mounted as to project from a cylindrical lens frame 501 for holding a lens 500 used to correct a light image shift, and a ring-shaped ultrasonic actuator 503 is mounted on the flange 502. The flange 502 is accommodated in a ring-shaped casing 504 having a U-shaped cross section, and the rear surface of the flange 502 is fixed to one inner surface 504a of the casing 504 via a spring 505 so that the ultrasonic actuator 503 is pressed into contact with the other inner surface 504b of the casing 504.

The ring-shaped ultrasonic actuator 503 used in this image shift correcting device is constructed by evenly adhering four fan-shaped piezoelectric devices 503b to a ring-shaped elastic member 503a as shown in FIG. 25. For instance, by driving a pair of piezoelectric devices 503b opposed to each other in Y-direction of FIG. 25, a distortion of making an elliptical motion in a plane (YZ-plane) including Y-axis and perpendicular to XY-plane is created on the upper surface of the elastic member 503a. On the other hand, by driving a pair of piezoelectric devices 503b opposed to each other in X-direction, a distortion of making an elliptical motion in a plane (XZ-plane) including X-axis and perpendicular to XY-plane is created on the upper surface of the elastic member 503a.

In this image shift correcting device, contact points 503c to be held in contact with the inner surface 504b of the casing 504 project in specified positions with respect to X-direction and Y-direction of the elastic member 503a, and an elliptical motion in the XZ-plane or YZ-plane created on the elastic member 503a is transmitted via the contact points 503c to relatively move the flange 502 in X-direction or Y-direction with respect to the inner surface 504b of the casing 504. In this way, the lens 500 is moved in the plane (XY-plane) perpendicular to an optical axis L of a taking lens to correct a light image shift on a focusing plane.

In the light image shift correcting device disclosed in the above publication, distortions created on the upper surface of the elastic member differ depending on the shape, number and positions of the piezoelectric devices 503b adhered to the elastic member 503a, and transmitting positions of driving forces for effectively driving the flange 502 is restricted. This disadvantageously makes the construction of the ultrasonic actuator 503 complicated and causes the characteristic thereof to largely vary. Further, the driving force transmitting positions on the upper surface of the elastic member 503 are symmetrical with respect to Y-axis in the case of driving in X-direction, whereas they are symmetrical with respect to X-axis in the case of driving in Y-direction. Further, the phases of the driving forces outputted from these positions differ. Thus, it is necessary to effectively combine the driving forces at the two transmitting positions so as not to cause a loss of the driving forces, which presents the problem of a difficult drive control.

SUMMARY OF THE INVENTION

It is an object of the present invention to provide a light image shift correcting device and an optical device which are free from the problems residing in the prior art.

According to an aspect of the invention, a light image shift correcting device comprises a planar member having a reference surface perpendicular to an optical axis of a focusing optical system, a shift correcting optical member having a flange portion at its periphery, an urger for movably pressing the shift correcting optical member against the reference surface of the planar member at a plurality of parts of the flange portion, a torus type piezoelectric actuator pressed against the flange portion by a part of the urger, and a controller for controlling the torus type piezoelectric actuator.

According to another aspect of the invention, an optical device comprises an optical member, a holder for holding the optical member, the holder having a flat surface parallel with a specified direction, a guide for keeping the holder to move in the specified direction, and a torus type piezoelectric actuator which is in contact with the flat surface and moves the holder in the specified direction.

These and other objects, features and advantages of the present invention will become more apparent upon a reading of the following detailed description and accompanying drawings.

BRIEF DESCRIPTION OF THE DRAWINGS

FIG. 25 is a perspective view showing a construction of an ultrasonic motor used in the conventional image shift correcting device.

DETAILED DESCRIPTION OF THE PREFERRED EMBODIMENTS OF THE INVENTION

Figure 1:
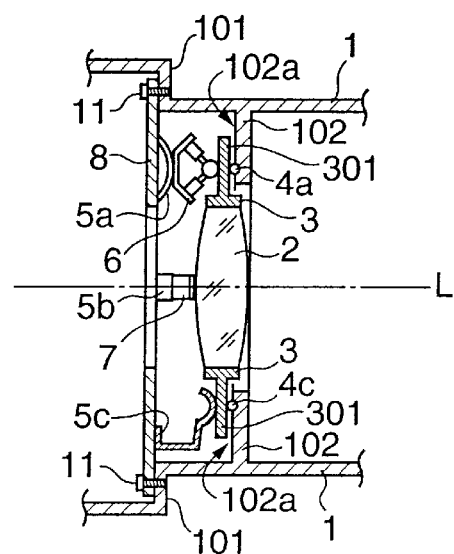
FIG. 1 is a section showing a main portion of a light image shift correcting device according to an embodiment of the invention.
Figure 2:
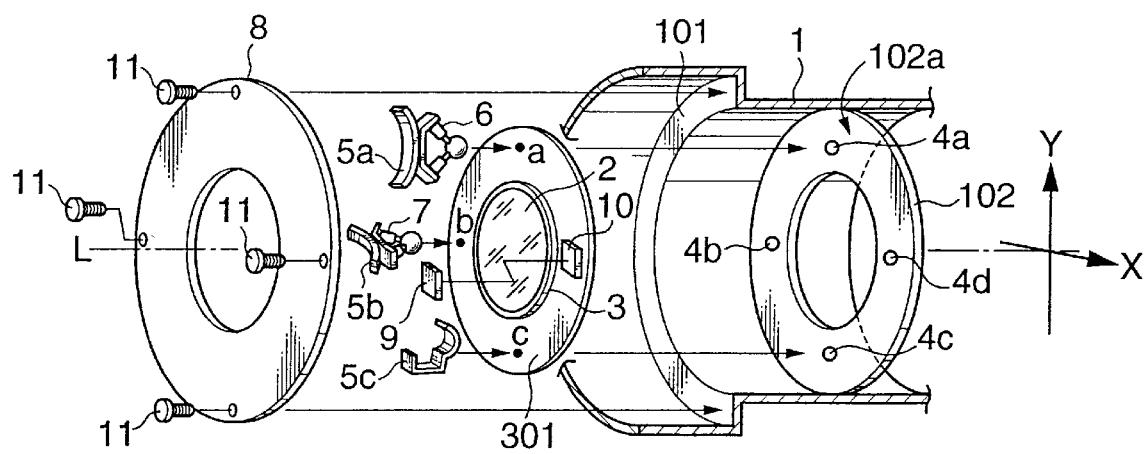
FIG. 2 is an exploded perspective view showing the main portion of the light image shift correcting device.

Referring to FIGS. 1 and 2, a light image shift correcting device is provided in a lens barrel 1 of a camera. The lens barrel 1 is formed with a stepped portion 101 and a ring-shaped guide plate 102 which is located in a specified position more toward a focusing plane than the stepped portion 101 and projects inwardly. A planar portion 102a which is substantially perpendicular to an optical axis L is formed on a surface of the guide plate 102 toward the stepped portion 101. The planar portion 102a acts as a holding member for holding a lens 2 for shift correction (hereinafter, referred to as "correcting lens 2") in a suspended state perpendicularly to the optical axis L by being brought into contact with a flange 301 of a lens frame 3 as described later, and also acts as a guide surface for moving the flange 301 in a plane substantially perpendicular to the optical axis L.

Accordingly, as shown in FIG. 2, four ball members 4a, 4b, 4c, 4d are rotatably embedded in specified upper and lower positions (located in Y-direction in FIG. 2) and specified left and right positions (located in X-direction in FIG. 2) for slidably receiving the flange 301. The ball members 4a, 4b, 4c, 4d may coincide with pressing points "a", "b", "c", "d" of the flange 301, but it is better to slightly displace them from the pressing points "a" to "d" in order to stably hold the correcting lens 2 and prevent tilting of the correcting lens 2 during movement.

The correcting lens 2 is held by the ring-shaped lens frame 3 having the flange 301 projecting from its outer periphery. The flange 301 is pressed toward the guide plate 102 in its specified upper ((+)Y-side), lower ((−)-Y-side) and left ((−) X-side) positions by spring forces of spring members 5a, 5b, 5c formed of leaf springs, thereby holding the correcting lens 2 in a suspended state between the spring members 5a to 5c and the guide plate 102 (see FIG. 2). Although the leaf springs are used as the spring members in this embodiment, coil springs or other kind of urging members may be used.

Figure 3:
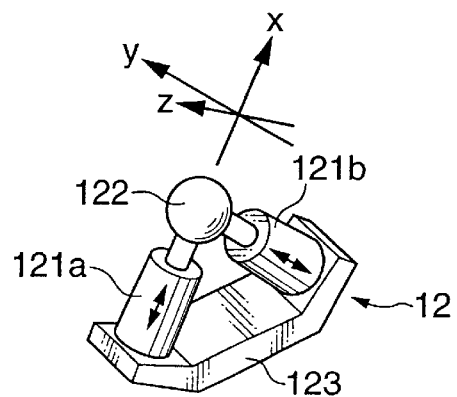
FIG. 3 is a perspective view showing a construction of a two-phase torus type piezoelectric actuator.

Torus type piezoelectric actuators 6, 7 are mounted at the upper and left pressing points "a", "b" of the flange 301 between the spring members 5a, 5b and the flange 301. The lens frame 3 is moved on the planar portion 102a of the guide plate 102 by transmitting driving forces of the piezoelectric actuators 6, 7 to the flange 301, so that the correcting lens 2 is moved in a plane (XY-plane) substantially perpendicular to the optical axis L. In this embodiment, the piezoelectric actuators 6, 7 are formed by two-phase torus type piezoelectric actuators 12 shown in FIG. 3. Each piezoelectric actuator 12 is constructed such that two laminated piezoelectric devices 121a, 121b are so arranged as to make their displacing directions substantially normal to each other, the leading ends of piezoelectric devices 121a, 121b are fixed to a contact member 122, and the bottom ends thereof are fixed to the opposite ends of a base member 122 having a boat-shaped cross section.

When drive voltages or drive currents in the form of sine waves are supplied to the laminated piezoelectric devices 121a, 121b from an unillustrated drive signal generating circuit, the respective piezoelectric devices 121a, 121b repeat elongation and contraction in their longitudinal directions (directions indicated by arrows in FIG. 3) and vibrate. Accordingly, if sine-wave drive signals Va, Vb whose phases are shifted from each other are supplied to the respective piezoelectric devices 121a, 121b, the contact member 122 makes an elliptical motion in a plane (xy-plane in FIG. 3) including the two piezoelectric devices 121a, 121b.

Figure 4:
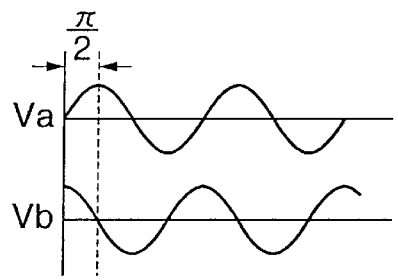
FIG. 4 is a graph showing an exemplary waveform of drive signals supplied to the two-phase torus type piezoelectric actuator.

Particularly in the case that the phases of the drive signals Va, Vb are shifted by $\pi/2$ as shown in FIG. 4, an x-direction displacement of the contact member 122 caused by the piezoelectric device 121a and a y-direction displacement of the contact member 122 caused by the piezoelectric device 121b are $A \cdot \sin \omega t$ and $A \cdot \cos \omega t$, respectively. Thus, the contact member 122 makes a circular motion in xy-plane.

Figure 5:
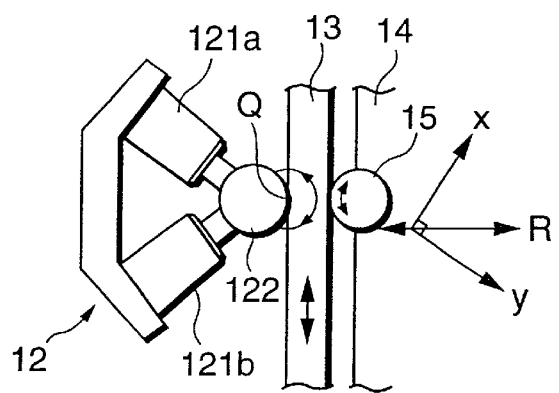
FIG. 5 is a diagram showing moving directions of a plate member (or driven member) when the piezoelectric actuator is driven by drive signals shown in FIG. 4.

Accordingly, if the contact member 122 of the torus type piezoelectric actuator 12 is caused to make an elliptical or circular motion with the plate member 13 tightly held between the ball member 15 embedded in the guide plate 14 and the contact member 122 of the piezoelectric actuator 12, a driving force of the contact member 122 is transmitted to the plate member 13 due to a frictional force acting between the contact member 122 and the plate member 13, and the plate member 13 is moved by being pushed by a component of the driving force created at a contact point Q of the contact member 122 and parallel to the surface of the plate member 13. In other words, the plate member 13 is moved downward in xy-plane if the contact point Q is caused to make a circular motion in clockwise direction in FIG. 5, whereas the plate member 13 is moved upward in xy-plane if the contact point Q is caused to make a circular motion in counterclockwise direction.

If sine-wave drive signals of the same phase are supplied to the respective piezoelectric devices 121a, 121b of the two-phase torus type piezoelectric actuator 12 (i.e. if, for example, the drive signal Va (or Vb) is supplied to both piezoelectric devices 121a, 121b), the contact point Q of the contact member 13 is displaced only transversely (directions R in FIG. 5), a force acting in a direction normal to the surface of the plate member 13 is transmitted to the plate member 13, thus, the plate member 13 is not vertically moved.

Referring back to FIG. 2, the spring members 5a, 5b are integrally secured to the rear surfaces of the bases of the piezoelectric actuators 6, 7, and the piezoelectric actuators 6, 7 provided with the spring members are mounted in specified positions (positions facing the pressing points "a", "b" of the flange 301 in FIG. 2) of a support member 8 formed of a ring-shaped plate. The spring member 5c is directly mounted in a specified position (position facing the pressing point "c" of the flange 301 in FIG. 2) of the support member 8. At this time, the piezoelectric actuators 6, 7 are mounted such that their lens frame driving directions are normal to each other.

In FIG. 2, the piezoelectric actuator 6 mounted at an upper side of the flange 301 is so mounted as to create a vertically acting driving force, whereas the piezoelectric actuator 7 mounted at a lower side of the flange 301 is so mounted as to create a transversely acting driving force.

Figure 6:
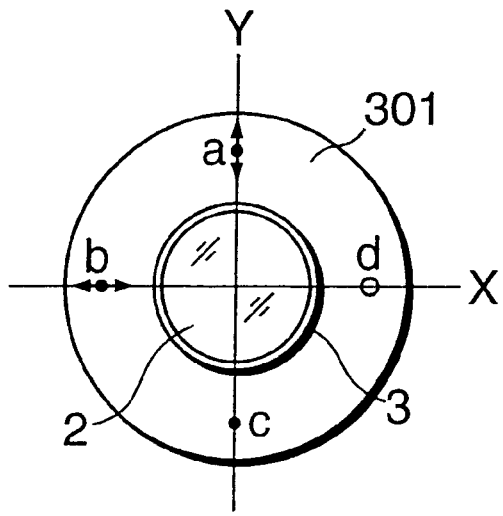
FIG. 6 is a diagram showing an exemplary arrangement of pressing points on a flange of a lens frame and driving directions of the two-phase piezoelectric actuator.

FIG. 6 is a diagram of the correcting lens 2 mounted on the lens frame 3 when viewed from the side of the support member 8, showing positions of the pressing points "a", "b", "c" and the moving directions of the respective piezoelectric actuators 6, 7. Black points indicate the pressing points, and arrows indicate the driving directions of the piezoelectric actuators 6, 7. It should be noted the XY coordinate systems shown in FIG. 6 are same as those set in FIG. 2.

Figure 7:
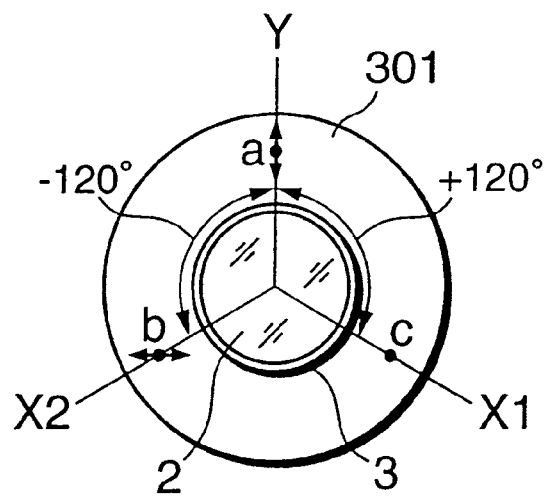
FIG. 7 is a diagram showing another exemplary arrangement of pressing points on the flange of the lens frame and driving directions of the two-phase piezoelectric actuator.

As shown in FIG. 6, the piezoelectric actuator 6 acts as a driving source for driving the correcting lens 2 in Y-direction, whereas the piezoelectric actuator 7 acts as a driving source for driving the correcting lens 2 in X-direction. It should be noted that the functions of the piezoelectric actuators 6, 7 may be reversed. In order to balance the pressing points of the flange 301, position "d" symmetrical with the pressing point "b" about the center along X-direction as indicated by a white point in FIG. 6 may also be pressed by a spring member. Alternatively, as shown in FIG. 7, the pressing points "b", "c" may be set on X1-axis, X2-axis spaced from Y-axis by ±120°.

A light emitter 9 as a part of a position detecting sensor for detecting the position of the correcting lens 2 is mounted in a specified position (position substantially symmetrical with the piezoelectric actuator 7 in FIG. 2) of the support member 8. On the other hand, a light detector 10 as a part of the position detecting sensor is mounted is a position of the lens frame 3 symmetrical with the pressing point "b" of the flange 301. When the correcting lens 2 is assembled in the lens barrel 1, the light emitter 9 and the light detector 10 are opposed to each other to form the position detecting sensor.

More specifically, the correcting lens 2 is mounted by vertically orienting the lens barrel 1 with the planar portion 102a of the guide plate 102 faced up, placing the lens frame 3 on the planar portion 102a of the guide plate 102 while aligning the pressing points "a", "c" of the flange 301 with respect to the vertical direction (Y-direction) of the lens barrel 1, inserting the support member 8 having the spring member 5c, the piezoelectric actuators 6, 7 provided with the spring members and the light emitter 9 mounted into the lens barrel 1, and securing a peripheral portion of the support member 8 to the stepped portion 101 by screws. At this stage, the light emitter 9 and the light detector 10 are opposed to each other.

Thus, the correcting lens 2 is so held in a suspended state as to be movable along the planar portion 102a of the guide plate 102 by the piezoelectric actuators 6, 7, the spring member 5c and the guide plate 102 by pressing the specified pressing points "a", "b", "c" of the flange 301 of the lens frame 3 against the guide plate 102 by the spring forces of the spring members 5a, 5b, 5c. Therefore, the correcting lens 2 can be so held as to be movable in a plane substantially perpendicular to the optical axis L by a simple construction, which enables a small and compact construction of the shift correcting device.

When the correcting lens 2 is moved in the plane substantially perpendicular to the optical axis L in order to correct a shift of a light image on a focusing plane, a spot light is emitted from the light emitter 9 to the light detector 10, which receives the emitted spot light. A moved amount (e.g. a relative moved amount from a reference position) of the correcting lens 2 is detected based on a position where the spot light is received. The reference position of the correcting lens 2 is set, for example, in accordance with a set reference light receiving position of the light detector 10, i.e. is a position of the correcting lens 2 when the spot light is received at the reference light receiving position. Alternatively, the guide plate 102 may be provided with a movement restricting member so that the movement of the flange 301 can be stopped at a specified position. The reference position of the correcting lens 2 may be set at a position where the flange 301 is in this specified position.

Figure 8:
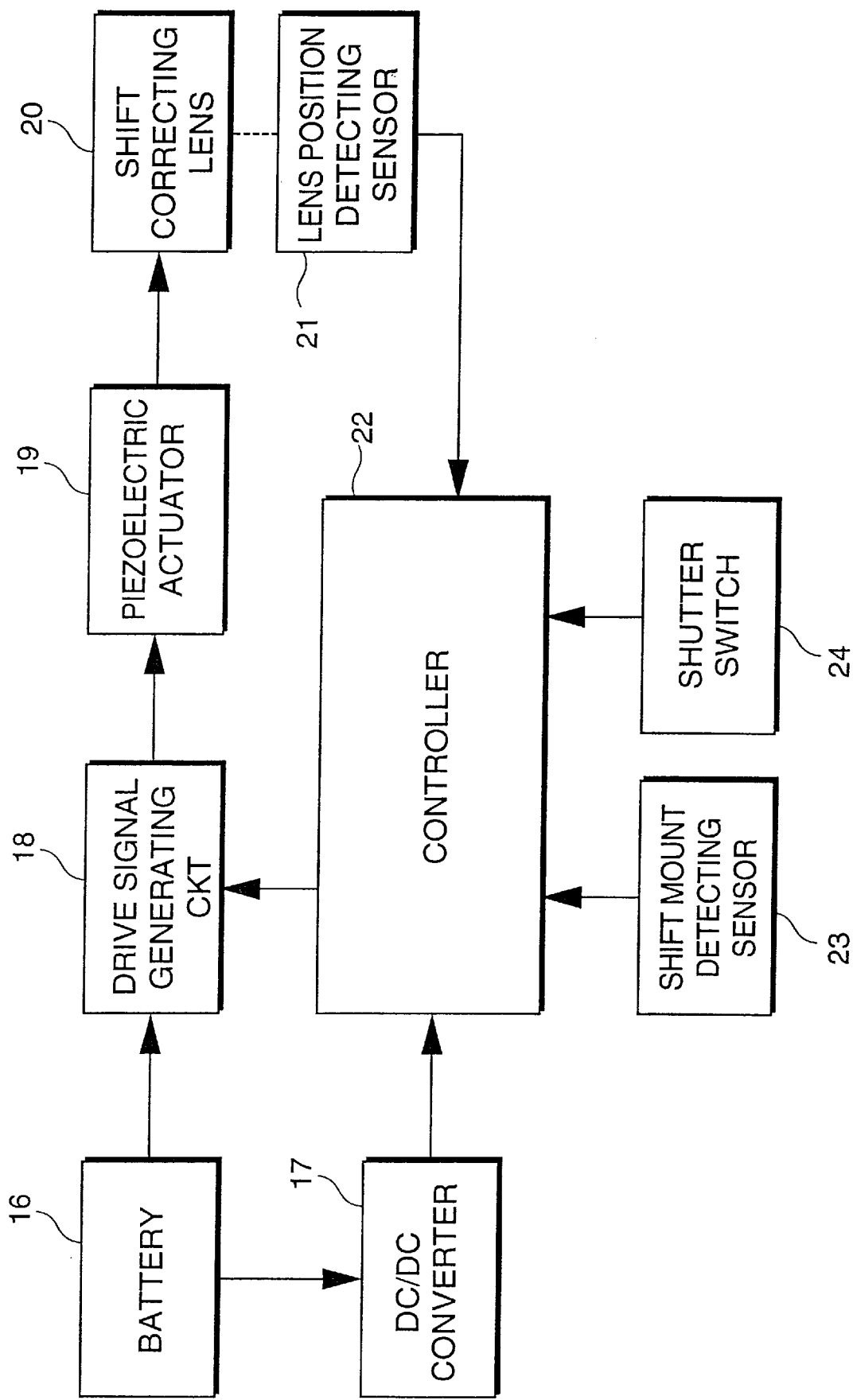
FIG. 8 is a block diagram showing a control of a camera provided with a light image shift correcting device for correcting a light image shift.

FIG. 8 is a block diagram showing a control of a camera provided with the light image shift correcting device for correcting a light image shift.

In FIG. 8, a battery 16 is a power source of the camera. The battery 16 also serves as a power source of the piezoelectric actuator 19. A dc/dc converter 17 generates a drive voltage for a controller 22 using an output of the battery 16. A drive signal generating circuit 18 is a circuit for generating driving voltages or drive currents (drive signals Va, Vb shown in FIG. 4) for the piezoelectric actuator 19 using an output of the battery 16. The drive signal generating circuit 18 is controllably driven by the controller 22.

The piezoelectric actuator 19 drives the correcting lens 2 and corresponds to the aforementioned two-phase torus type piezoelectric actuators 6, 7. A shift correcting lens 20 is adapted to correct a shift of a light image focused on the focusing plane and corresponds to the aforementioned correcting lens 2. A lens position detecting sensor 21 detects the position of the shift correcting lens 20, and corresponds to the position detecting sensor formed by the aforementioned light emitter 9 and light detector 10. A detection signal of the lens position detecting sensor 21 is inputted to the controller 22.

The controller 22 controls a photographing operation of the camera and controllably drives the shift correcting lens 20 to correct a shift of an image. The controller 22 generates a drive control signal for moving the shift correcting lens 20 in a specified direction in accordance with the detection signal inputted from the lens position detecting sensor 21, and outputs the drive control signal to the drive signal generating circuit 18 to control the drive of the shift correcting lens 20.

A shift amount detecting sensor 23 detects a shift amount of the light image on the focusing plane caused by a shake of hands. A known sensor such as the one which indirectly detects a shift of a light image by detecting an acceleration and an angular acceleration when the camera main body is shaken or the one which directly detects a shift of a light image by means of an area sensor is used as the sensor 23. A shutter switch 24 is an operable switch for instructing a shutter release (exposure).

In the above construction, when an exposure is instructed by the shutter switch 24, the controller 22 generates a drive control signal for driving the shift correcting lens 20 to cancel a shift amount of the light image on an exposure surface based on this shift amount detected by the shift amount detecting sensor 23 during the exposure, and outputs this drive control signal to the drive signal generating circuit 18. The drive signal generating circuit 18 generates drive voltages or drive currents based on the drive control signal inputted from the controller 22, and outputs them to the piezoelectric actuator 19. For example, in the case of voltage-driving, the drive signal generating circuit 18 generates drive voltages (V6a, V6b), (V7a, V7b) for the piezoelectric actuators 6, 7.

In FIG. 6, when the correcting lens 2 is moved, for example, in X-direction (transverse direction), the drive voltages (V7a, V7b) whose phases are shifted by $\pi/2$ and the drive voltages (V6a, V6b) having the same phase are generated and supplied to the piezoelectric actuators 7, 6, respectively.

Whether the correcting lens 2 is moved in (+)X-direction or (−)X-direction is determined by controlling a phase difference between the drive voltages V7a and V7b as described above to thereby control a rotating direction of the contact point Q of the piezoelectric actuator 7.

The drive voltages (V6a, V6b) having the same phase are supplied to the piezoelectric actuator 6 for the following reason. When the drive of the piezoelectric actuator 6 is stopped, a force pressing the flange 301 via the piezoelectric actuator 6 becomes a load on a driving force by the piezoelectric actuator 7. This load is reduced by vibrating the contact point Q of the piezoelectric actuator 6 in directions normal to the flange 301. If the load created by stopping the drive of the piezoelectric actuator 6 should present any particular problem, the piezoelectric actuator 6 might be stopped for power saving.

Similarly, when the correcting lens 2 is moved, for example, in Y-direction (vertical direction), the drive voltages (V6a, V6b) whose phases are shifted by $\pi/2$ and the drive voltages (V7a, V7b) having the same phase are generated and supplied to the piezoelectric actuators 6, 7, respectively. Whether the correcting lens 2 is moved in (+)Y-direction or (−)Y-direction is determined by controlling a phase difference between the drive voltages V6a and V6b to thereby control a rotating direction of the contact point Q of the piezoelectric actuator 6.

Further, when the correcting lens 2 is moved in an arbitrary direction in XY-plane, amplitudes of the drive voltages V6 and V7 are suitably adjusted, and the drive voltages (V6a, V6b), (V7a, V7b) whose phases are respectively shifted by $\pi/2$ are generated and supplied to the piezoelectric actuators 6, 7. The amplitudes of the drive voltages (V6a, V6b), (V7a, V7b) are controlled in accordance with the moving direction of the correcting lens 2. In other words, the respective amplitudes of the drive voltages (V6a, V6b), (V7a, V7b) are controlled so that a vectorially combined force of the driving forces of the piezoelectric actuators 6, 7 acts in the driving direction of the correcting lens 2, thereby controlling the rotating directions and rotational forces of the contact members of the piezoelectric actuators 6, 7.

Figure 9:
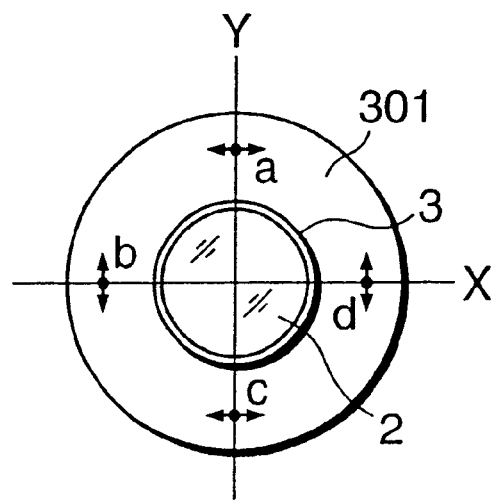
FIG. 9 is a diagram showing an exemplary arrangement of piezoelectric actuators and their driving directions in the case that a correcting lens is driven using three two-phase torus type piezoelectric actuators.

Although the two two-phase torus type piezoelectric actuators 12 are provided at the pressing points "a", "b" as an X-direction driving source and a Y-direction driving source as shown in FIG. 6 or 7 in this embodiment, additional two piezoelectric actuators 12 may also be provided at the pressing points "c", "d" as an X-direction driving source and a Y-direction driving source as shown in FIG. 9. Since four pressing points of the flange 301 are vertically and horizontally symmetrically provided according to this method, the lens frame 3 can be more stably held in a suspended state and the driving forces can be advantageously increased since two each of the X-direction driving sources and the Y-direction driving sources are provided. Further, according to this method, the two piezoelectric actuators 12 at the pressing points "a", "c" are synchronized with each other and the two piezoelectric actuators 12 at the pressing points "b", "d" are synchronized with each other so as not to cause a driving loss.

Figure 10:
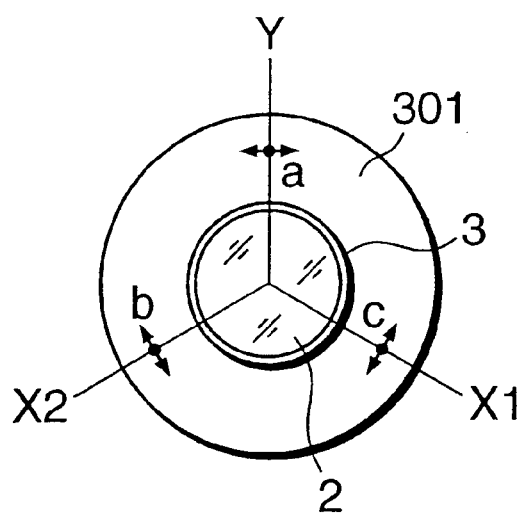
FIG. 10 is a diagram showing an exemplary arrangement of piezoelectric actuators and their driving directions in the case that the correcting lens is driven using four two-phase torus type piezoelectric actuators.

Further, as shown in FIG. 10, three two-phase torus type piezoelectric actuators may be provided at the pressing points "a", "b", "c" shown in FIG. 7 as circumferential direction driving sources of the flange 301. Since the number of the piezoelectric actuators 12 is more than that of the embodiment shown in FIG. 6 by one or less than that of the embodiment shown in FIG. 9 by one according to this driving method, there is an advantage that a compact correcting lens driving device having a large driving force can be constructed. It should be noted that the three piezoelectric actuators may serve as radial direction driving sources in FIG. 10.

Figure 11:
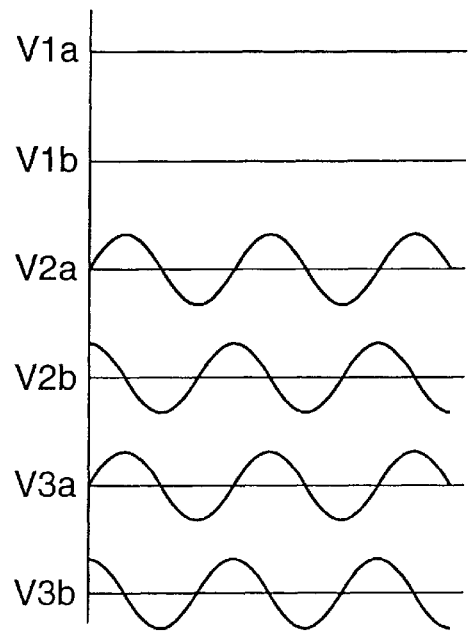
FIG. 11 is a graph showing an exemplary waveform of drive signals supplied to the respective piezoelectric actuators for driving the correcting lens in (−)X-direction by the driving method shown in FIG. 10.
Figure 12:
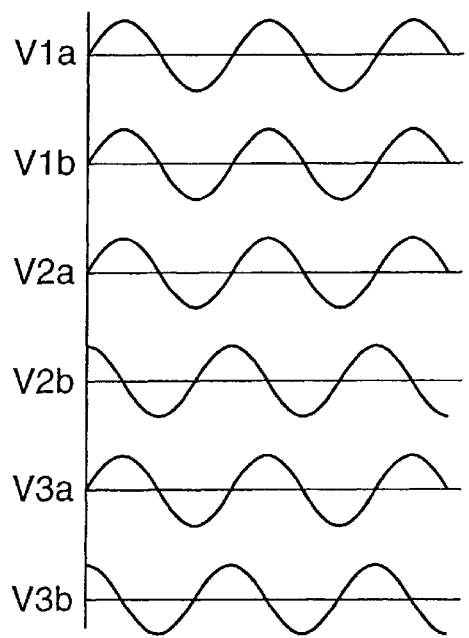
FIG. 12 is a graph showing an exemplary waveform of drive signals supplied to the respective piezoelectric actuators for driving the correcting lens in (+)Y-direction by the driving method shown in FIG. 10.

Since the driving directions of the piezoelectric actuators do not coincide with X- and Y-directions according to the driving method shown in FIG. 10, various driving methods can be considered. The correcting lens 2 is moved by a vectorially combined force of the driving forces Fa, Fb, Fc of the piezoelectric actuators provided at the pressing points "a", "b", "c". Thus, vectorially combined forces of desired directions may be created by adjusting the driving forces Fa, Fb, Fc. However, according to this method, the drive control of the three piezoelectric actuators are generally complicated. FIGS. 11 and 12 show exemplary waveforms of the drive signals for driving the correcting lens 2 in (−)X-direction and (+)Y-direction by a relatively simple method. In FIGS. 11 and 12, drive signals (V1a, V1b), (V2a, V2b), (V3a, V3b) are waveforms of the driving signals supplied to the two-phase torus type piezoelectric actuators at the pressing points "a", "b", "c".

When the correcting lens 2 is moved in (−)X-direction, such drive signals (V2a, V2b), (V3a, V3b) (=A·sin ωt, A·cos ωt) that the phases of the drive signals V2b, V3b are advanced from those of the drive signals V2a, V3a by $\pi/2$ and the amplitudes of the drive signals V2 and V3 are equal are supplied to a two-phase torus type piezoelectric actuator at the pressing point "b" (hereinafter, piezoelectric actuator B) and a two-phase torus type piezoelectric actuator at the pressing point "c" (hereinafter, piezoelectric actuator C) without supplying no drive signal to a two-phase torus type piezoelectric actuator at the pressing point "a" (hereinafter, piezoelectric actuator A) as shown in FIG. 11.

Figure 13:
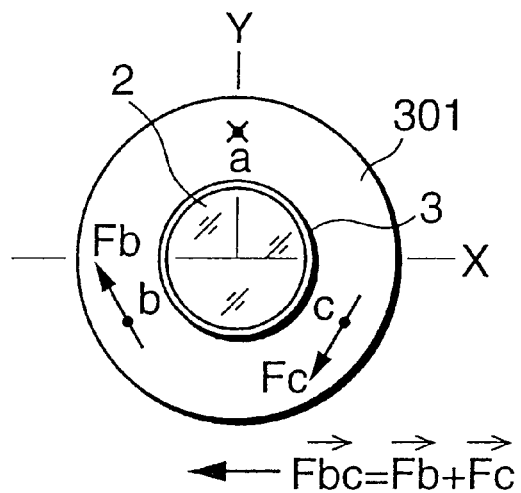
FIG. 13 is a diagram showing driving forces created on the respective piezoelectric actuators when the drive signals shown in FIG. 11 are supplied.

When the drive signals (V1a, V1b), (V2a, V2b), (V3a, V3b) shown in FIG. 11 are supplied to the piezoelectric actuators A, B, C, the piezoelectric actuator A is stopped as shown in FIG. 13, the piezoelectric actuator B acts as a driving source for driving the correcting lens 2 in an obliquely upward- direction to the left and the piezoelectric actuator C acts as a driving source for driving the correcting lens 2 in an obliquely downward direction to the left.

Accordingly, if the driving forces Fb, Fc of the piezoelectric actuators B, C are combined, the driving forces acting in Y-direction are canceled, leaving only a driving force Fbc acting in (−)X-direction, with the result that the correcting lens 2 is rotated clockwise about the pressing point "a". Since the correcting lens 2 is rotated about the pressing point "a" to a very small degree, the correcting lens 2 is substantially moved in (−)X-direction.

If the drive signals (V2a, V2b), (V3a, V3b) are changed such that the phases of the drive signals V2a, V3a are advanced from those of the drive signals V2b, V3b (i.e. (V2a, V2b)=(V3a, V3b)=(A·cos ωt, A·sin ωt), the piezoelectric actuator B acts as a driving source for driving the correcting lens 2 in an obliquely downward direction to the right and the piezoelectric actuator C acts as a driving source for driving the correcting lens 2 in an obliquely upward direction to the right. As a result, the correcting lens 2 is rotated counterclockwise about the pressing point "a".

When the correcting lens 2 is driven in (+)Y-direction, the drive signals ((V1a, V1b)=(A·sin ωt, A·cos ωt)) having the same phase are supplied to the piezoelectric actuator A as shown in FIG. 12, and such drive signals ((V2a, V2b)=(V3a, V3b)=(A·sin ωt, A·cos ωt)) that the phases of drive signals V2b, V3b are advanced from those of the drive signals V2a, V3a by π/2 are supplied to the piezoelectric actuators B, C.

Figure 14:
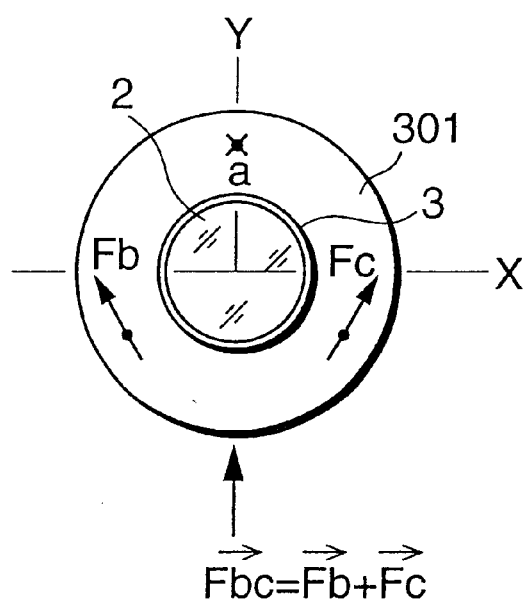
FIG. 14 is a diagram showing driving forces created on the respective piezoelectric actuators when the drive signals shown in FIG. 12 are supplied.

When the drive signals (V1a, V1b), (V2a, V2b), (V3a, V3b) shown in FIG. 12 are supplied to the piezoelectric actuators A, B, C, the piezoelectric actuator A presses the flange 301 as shown in FIG. 14 (i.e. presses the flange 301 at a frictional force lower than the one when the piezoelectric actuator A is stopped), the piezoelectric actuator B acts as a driving source for driving the correcting lens 2 in an obliquely upward direction to the left and the piezoelectric actuator C acts as a driving source for driving the correcting lens 2 in an obliquely upward direction to the right.

Accordingly, if the driving forces Fb, Fc of the piezoelectric actuators B, C are combined, the driving forces acting in X-direction are canceled, leaving only a driving force Fbc acting in (+)Y-direction, with the result that the correcting lens 2 is rotated upward. When the drive signals are so changed as to advance the phase of the drive signals V2a, V3a from those of the drive signals V2b, V3b by π/2 (i.e. when ((V2a, V2b)=(V3a, V3b)=(A·cos ωt, A·sin ωt)), the piezoelectric actuator B acts as a driving source for driving the correcting lens 2 in an obliquely downward direction to the right and the piezoelectric actuator C acts as a driving source for driving the correcting lens 2 in an obliquely downward direction to the left.

Figure 15:
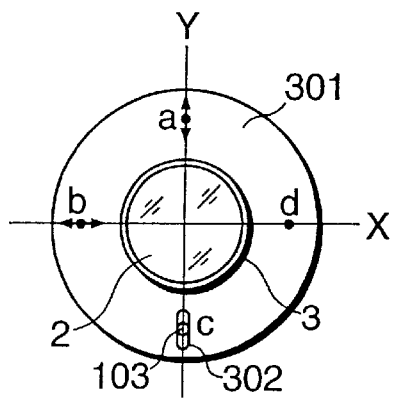
FIG. 15 is a diagram showing another embodiment in which a guiding mechanism for guiding movement of a correcting lens is provided in a position corresponding to the pressing point "c" of the flange in FIG. 6.
Figure 16:
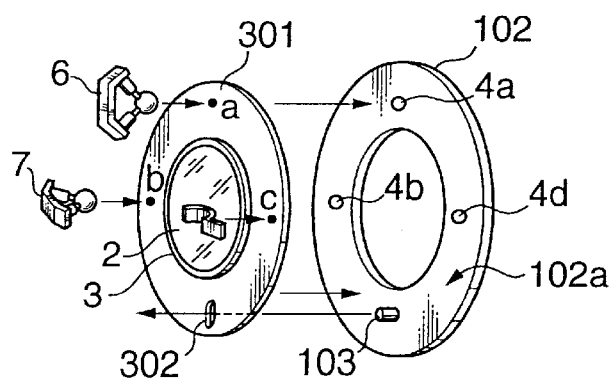
FIG. 16 is an exploded perspective view showing a main construction of the guiding mechanism provided in the flange of the lens frame.

Although the flange 301 of the lens frame 3 is held by being squeezed between a combination of the piezoelectric actuators 6, 7 and the spring member 5c and the guide plate 102 in this embodiment, an oblong hole 302 extending in Y-direction may be formed in a position corresponding to the pressing point "c" of the flange 301 and a pin 103 projecting from a corresponding position of the guide plate 102 may be fitted in the oblong hole 302 to guide the moving direction of the flange 301 as shown in FIGS. 15 and 16.

Since the flange 301 is guided to move in a direction rotating about the pin 103 and a direction along the extension of the oblong hole 302 (Y-direction), the correcting lens 2 is guided by the pin 103 and the oblong hole 302 to move straight in Y-direction when only the piezoelectric actuator 6 at the pressing point "a" is driven, whereas it is rotated clockwise or counterclockwise about the pin 103 when only the piezoelectric actuator 7 at the pressing point "b" is driven. Since this rotating amount is very small, the correcting lens 2 is substantially moved in X-direction.

When the piezoelectric actuators 6, 7 are simultaneously driven, the flange 301 is moved in a direction of a combination of the Y-direction movement by the pin 103 and the oblong hole 302 and the rotational movement about the pin 103 (i.e. an arbitrary oblique direction in XY-plane, the correcting lens 2 can be moved in any desired direction except X-direction and Y-direction.

This embodiment has advantages of an easy control of the movable range of the correcting lens 2 and an easy control of the return to an initial position since the movement of the lens frame 3 is guided by the pin 103 and the oblong hole 302.

The position of the oblong hole 302 is not limited to a point corresponding to the pressing point "c" of the flange 301, but may be set in any desired position of the flange 301. The movable range and the moving direction of the flange 301 can also be suitably adjusted as design items.

Figure 17:
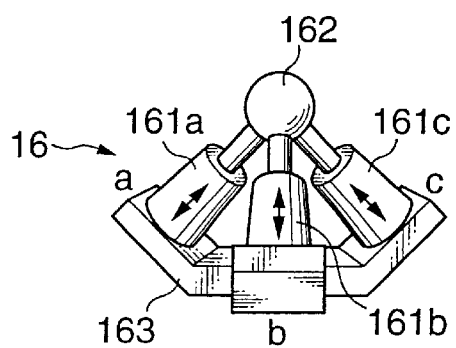
FIG. 17 is a perspective view showing a construction of a three-phase torus type piezoelectric actuator.
Figure 18:
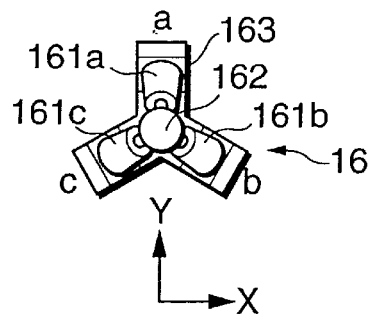
FIG. 18 is a plan view showing a construction of the three-phase torus type piezoelectric actuator.
Figure 19:
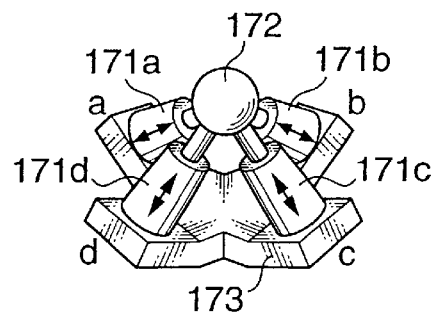
FIG. 19 is a perspective view showing a construction of a four-phase torus type piezoelectric actuator.
Figure 20:
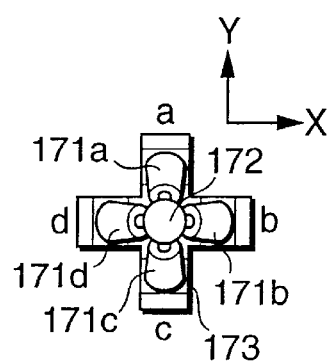
FIG. 20 is a plan view showing a construction of the four-phase torus type piezoelectric actuator.

Although the two-phase torus type piezoelectric actuators are used as driving sources for the correcting lens 2 in the above embodiment, a three-phase torus type piezoelectric actuator 16 shown in FIGS. 17 and 18 and a four-phase torus type piezoelectric actuator 17 shown in FIGS. 19 and 20 may be used as a driving source for the correcting lens 2.

The three-phase torus type piezoelectric actuator 16 is constructed such that three laminated piezoelectric devices 161a, 161b, 161c are so arranged along ridges contacting an apex of a right triangular pyramid as to extend orthogonal to each other, the leading ends of the respective piezoelectric devices 161a, 161b, 161c are fixed by a contact member 162, and the base ends thereof are fixed at the leading ends of three pieces of a Y-shaped base member 163. These three pieces are each bent at an obtuse angle and are so coupled as to radially extend while being regularly circumferentially spaced apart from each other.

The three-phase torus type piezoelectric actuator 16 can control the moving direction of the contact member 162 to any desired direction in XY-plane in FIG. 18 by controlling the phases or amplitudes of drive voltages (or drive currents) to the piezoelectric devices 161a, 161b, 161c. In other words, the correcting lens 2 can be moved in any desired direction in XY-plane by the piezoelectric actuator 16 by one three-phase torus type piezoelectric actuator 16.

A drive control method disclosed in, e.g. Japanese Patent Publication No. 2531582 can be used as the one for the three-phase torus type piezoelectric actuator 16. In the case that the piezoelectric actuator 16 is used as a driving source for driving the correcting lens 2 in X-direction in FIG. 18, the drive signals Va, Vb (or Vb, Va) shown in FIG. 4 may be supplied to the piezoelectric devices 161b, 161c without applying no power to the piezoelectric device 161a. If the drive signals are supplied as above, Y-direction components of displacements of the contact member 162 caused by the extension/contraction of the piezoelectric devices 161b, 161c are canceled out, and only X-direction components remain. Thus, the piezoelectric actuator 16 can act as a driving source for driving the correcting lens 2 in X-direction. Further, in the case that the piezoelectric actuator 16 is used as a driving source for driving the correcting lens 2 in Y-direction in FIG. 18, the drive signals Va, Vb (or Vb, Va) shown in FIG. 4 may be supplied to the piezoelectric devices 161a, 161c (or 161a, 161b) without applying no power to the piezoelectric device 161b (or 161c). If the drive signals are supplied as above, X-direction components of displacements of the contact member 162 caused by the extension/contraction of the piezoelectric devices 161a, 161c (or 161a, 161b) are canceled out, and only X-direction components remain. Thus, the piezoelectric actuator 16 can act as a driving source for driving the correcting lens 2 in Y-direction.

The four-phase torus type piezoelectric actuator 17 is constructed such that four laminated piezoelectric devices 171a, 171b, 171c, 171d are arranged along ridges contacting an apex of a right pyramid having a square bottom such that the facing piezoelectric devices are orthogonal to each other, the leading ends of the respective piezoelectric devices 171a, 171b, 171c, 171d are fixed by a contact member 172, and the base ends thereof are fixed at the leading ends of three pieces of a cross-shaped base member 173. These three pieces are each bent at an obtuse angle and are so coupled as to radially extend while being regularly circumferentially spaced apart from each other.

The four-phase torus type piezoelectric actuator 17 can control the moving direction of the contact member 172 to any desired direction in XY-plane in FIG. 20 by controlling the phases or amplitudes of drive voltages (or drive currents) to the piezoelectric devices 171a, 171b, 171c. In other words, the correcting lens 2 can be moved in any desired direction in XY-plane by the piezoelectric actuator 17 by one four-phase torus type piezoelectric actuator 17.

In the case that the piezoelectric actuator 17 is used, for example, as a driving source for driving the correcting lens 2 in X-direction in FIG. 20, the drive signals Va, Vb (or Vb, Va) shown in FIG. 4 may be supplied to the piezoelectric devices 171b, 171d without applying no power to the piezoelectric devices 171a, 171c. If the drive signals are supplied as above, the contact member 172 is displaced only in X-direction by the extension/contraction of the piezoelectric devices 171b, 171d. Thus, the piezoelectric actuator 17 can act as a driving source for driving the correcting lens 2 in X-direction. Further, in the case that the piezoelectric actuator 17 is used as a driving source for driving the correcting lens 2 in Y-direction, the drive signals Va, Vb (or Vb, Va) shown in FIG. 4 may be supplied to the piezoelectric devices 171a, 171c without applying no power to the piezoelectric devices 171b, 171d. If the drive signals are supplied as above, the contact member 172 is displaced only in Y-direction by the extension/contraction of the piezoelectric devices 171a, 171c. Thus, the piezoelectric actuator 17 can act as a driving source for driving the correcting lens 2 in Y-direction.

Figure 21:
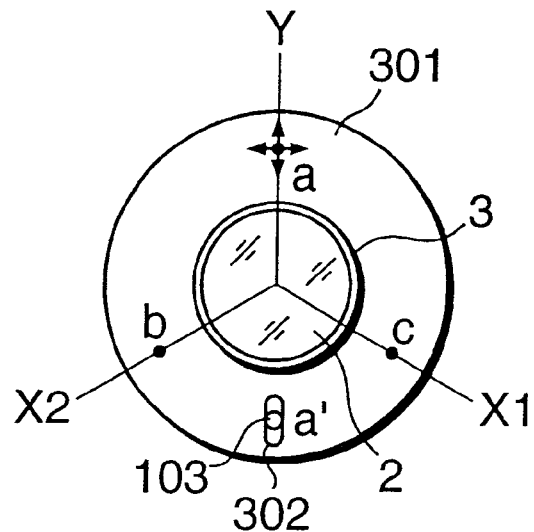
FIG. 21 is an exemplary arrangement of a piezoelectric actuator and a spring member in the case that the correcting lens is driven using one three-phase or four-phase torus type piezoelectric actuator.

FIG. 21 is a diagram showing an exemplary arrangement of the piezoelectric actuator and spring members when the correcting lens 2 is driven using one three-phase torus type piezoelectric actuator 16 or one four-phase torus type piezoelectric actuator 17.

FIG. 21 differs from FIG. 7 in that the three-phase or four-phase piezoelectric actuator is provided at the pressing point "a", the spring members are provided at positions corresponding to the pressing points "b", "c", and a guiding mechanism comprised of an oblong hole 302 and a pin 103 is provided at a position "a'" symmetrical with the piezoelectric actuator about the center of the flange 301. It should be noted that arrows at the point "a" indicate four typical directions of movement by the three-phase or four-phase piezoelectric actuator.

Since the pressing points "a", "b", "c" are symmetrically provided with respect to Y-axis in this embodiment, the lens frame 3 is stably held and can be stably moved without causing tilting. Further, since the guiding mechanism is provided at the position "a'" symmetrical with the pressing point "a" with respect to the optical axis of the correcting lens 2, the correcting lens 2 can be finely moved about the guiding mechanism by a driving force of the piezoelectric actuator provided at the pressing point "a", i.e. can be displaced with high precision. Further, since there is only one piezoelectric actuator as the driving source, there are advantages of a simple construction and a relatively easy drive control.

Figure 22:
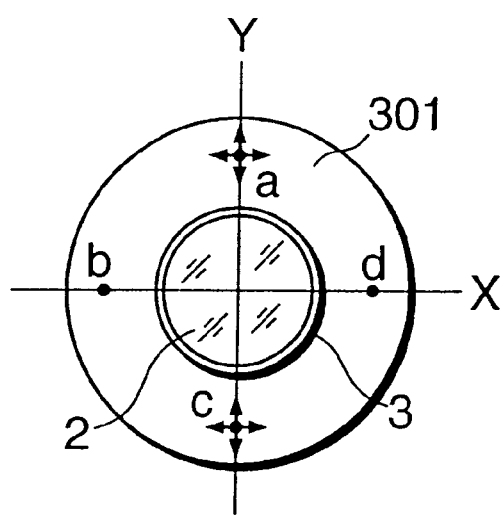
FIG. 22 is an exemplary arrangement of a piezoelectric actuator and spring members in the case that the correcting lens is driven using two three-phase or four-phase torus type piezoelectric actuator.

FIG. 22 is a diagram showing an exemplary arrangement of the piezoelectric actuators and spring members when the correcting lens 2 is driven using two three-phase torus type piezoelectric actuator 16 or two four-phase torus type piezoelectric actuator 17.

FIG. 22 differs from FIG. 9 in that the three-phase or four-phase piezoelectric actuators are provided at the pressing points "a", "c", and the spring members are provided at positions corresponding to the pressing points "b", "d". Arrows at the point "a", "c" indicate four typical directions of movement by the three-phase or four-phase piezoelectric actuator. It should be noted that the three-phase or four-phase piezoelectric actuators may be provided at the pressing points "b", "d", and the spring members are provided at positions corresponding to the pressing points "a", "c".

Since the flange 301 has two independent driving points in this embodiment, it is necessary, in order to reduce a driving loss, to control the drive of the two three-phase or four-phase piezoelectric actuators so as to move in the same direction by the same moving amount. Accordingly, the drive control is more complicated as compared to the embodiment of FIG. 21 in which only one three-phase or four-phase piezoelectric actuator is used, but there is an advantage of more smoothly moving the correcting lens 2 because of a larger driving force.

Figure 23:
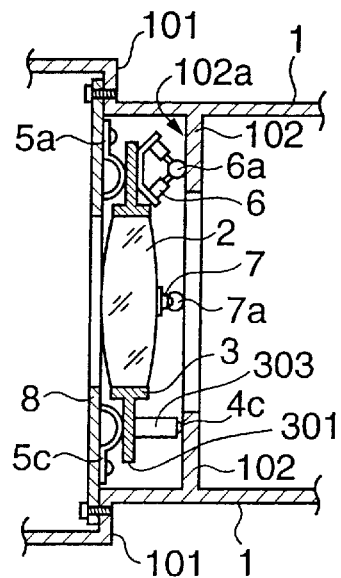
FIG. 23 is a diagram showing a modified arrangement of piezoelectric actuators in the light image shift correcting device according to the invention.
Figure 24:
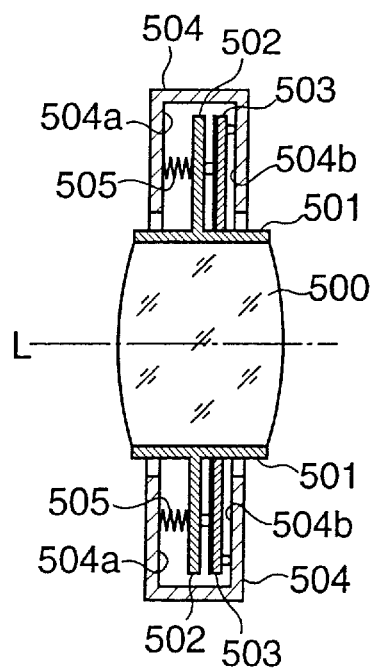
FIG. 24 is a section showing a main construction of a conventional image shift correcting device.

FIG. 23 is a diagram showing a modified arrangement of the piezoelectric actuators in the light image shift correcting device according to the invention.

An essential difference between the light image shift correcting device shown in FIG. 23 and the one shown in FIG. 1 lies in that the piezoelectric actuators 6, 7 are provided on a surface of the flange 301 facing the guide surface 102a. Since the contact members 6a, 7a of the piezoelectric actuators 6, 7 are directly pressed by the guide surface 102a in this embodiment, the ball members 4a,4b shown in FIG. 2 are not provided on the guide surface 102a. Further, since there is a clearance between the guide surface 102a and the flange 301, the ball members 4c, 4d shown in FIG. 2 are embedded at the leading ends of supporting bars 303 projecting in positions corresponding to the pressing points "c", "d" of the flange 301.

The type, number and arrangement of the piezoelectric actuators can be changed in various manners in this embodiment as well, and the same effects as the foregoing embodiment can be attained.

Although the pressing points of the flange 301 of the lens frame 3 are three or four in the foregoing embodiments, any number of pressing points equal to or larger than 2 can be provided. In the case of two pressing points, it is preferable to provide them in symmetrical positions with respect to the optical axis of the correcting lens 2 in order to stably hold the correcting lens 2. Further, in this case, the correcting lens 2 can be more stably held if the guide plate 102 is provided with a suitable number of ball members in positions displaced from the pressing points.

Further, the foregoing embodiment shows provision of an inventive image shift correcting device in a camera. However, an inventive image shift correcting device may be applicable to other optical apparatuses including telescopes and video cameras.

As described above, an inventive optical device comprises an optical member, a holder which holds the optical member, the holder having a flat surface parallel with a specified direction, a guide which keeps the holder to move in the specified direction, and a torus type piezoelectric actuator which is in contact with the flat surface and moves the holder in the specified direction. The optical member can be highly precisely moved in the specified direction by the torus type piezoelectric actuator. Thus, the optical device can be made smaller and more compact.

Also, an inventive image shift correcting device for optically correcting a shift of a light image on the focusing optical system due to a shake of hands is provided with a shift correcting optical member having a flange portion at its periphery while being suspended by pressing the flange portion at a plurality of parts against a planar member having a surface perpendicular to an optical axis of a focusing optical system by means of an urger and a torus type piezoelectric actuator urged by the urger. The shift correcting optical member can be moved in a perpendicular plane to the optical axis of the focusing optical system by directly transmitting a driving force of the torus type piezoelectric actuator to the flange portion. Accordingly, the shift correcting optical member can be highly precisely driven by the simple consecution, and the correcting device can be made smaller and more compact.

Particularly, if one three-phase or four-phase torus type piezoelectric actuator is used, the construction is more simplified and the shift correcting optical member can be easily moved in any desired direction in the perpendicular plane to the optical axis of the focusing optical system by a simple drive control.

Further, since the guiding mechanism is provided at the flange portion, the moving direction and the movable range of the shift correcting optical member can be restricted by the guiding mechanism. Thus, the movement of the shift correcting optical member can be securely controlled even if the flange portion is driven at one point.

If two two-phase torus type piezoelectric actuators are used as the driving sources for driving the shift correcting optical member in directions orthogonal to each other, the drive control for the respective piezoelectric actuators can be even simpler.

Further, when the shift correcting optical member is moved in the driving direction of one of the two-phase torus type piezoelectric actuators only by the driving force of this piezoelectric actuator, the other two-phase torus type piezoelectric actuator is vibrated in the direction of the optical axis of the shift correcting optical member. Thus, a frictional force acting on the flange portion of the shift correcting optical member held in contact with the other piezoelectric actuator can be reduced, thereby suppressing a reduction in the driving efficiency of the shift correcting optical member.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A light image shift correcting device comprising:
    a planar member having a reference surface perpendicular to an optical axis of a focusing optical system;
    a shift correcting optical member having a flange portion at its periphery;
    an urger which movably presses the shift correcting optical member against the reference surface of the planar member at a plurality of parts of the flange portion;
    a torus type piezoelectric actuator pressed against the flange portion by a part of the urger;
    a controller which controls the torus type piezoelectric actuator; and
    a guiding mechanism for guiding movement of the shift correcting member on a plane intersecting the optical axis of the focusing optical system, wherein
        the urger includes three or more urging parts, and the torus type piezoelectric actuator is provided at one of the urging parts and has a three-phase or a four-phase, and
        the guiding mechanism includes a pin attached on the reference surface of the planar member, and an oblong hole formed in the flange portion and engageable with the pin.

2. A light image shift correcting device comprising:
    a planar member having a reference surface perpendicular to an optical axis of a focusing optical system;
    a shift correcting optical member having a flange portion at its periphery;
    an urger which movably presses the shift correcting optical member against the reference surface of the planar member at a plurality of parts of the flange portion;
    a torus type piezoelectric actuator pressed against the flange portion by a part of the urger; and
    a controller which controls the torus type piezoelectric actuator, wherein
        the urger includes three or more urging parts, and a first two-phase torus type piezoelectric actuator is provided at a first urging part to move the shift correcting optical member in a first direction, and a second two-phase torus type piezoelectric actuator is provided at a second urging part to move the shift correcting optical member in a second direction perpendicularly intersecting the first direction.

3. A light image shift correcting device according to claim 2, wherein the controller controls the first and second two-phase torus type piezoelectric actuators so as to vibrate the first two-phase torus type piezoelectric actuator in a direction of the optical axis of the shift correcting optical member when the shift correcting optical member is moved in the second direction by the second two-phase torus type piezoelectric actuator only.

4. A optical device comprising
    an optical member;
    a holder which holds the optical member, the holder having a flat surface parallel with a specified direction;
    a guide which keeps the holder to move in the specified direction; and
    a torus type piezoelectric actuator which is in contact with the flat surface and moves the holder in the specified direction, wherein there are provided a first two-phase torus type piezoelectric actuator to move the optical member in a first direction on a plane perpendicularly intersecting an optical axis of the optical member, and a second two-phase torus type piezoelectric actuator to move the optical member in a second direction on the plane.

5. A light image shift correcting device comprising:

an optical member;

a holder which holds the optical member, the holder having a flat surface parallel with a specified direction;

a guide which keeps the holder to move in the specified direction;

a torus type piezoelectric actuator which is in contact with the flat surface and moves the holder in the specified direction;

a planar member having a reference surface perpendicular to an optical axis of the optical member; and an urger which movable presses the flat surface of the holder, wherein the torus type piezoelectric actuator includes a contact member in contact with the reference surface when the torus type piezoelectric actuator is in contact with the flat surface.

* * * * *